No. 777,826.                                              Patented December 20, 1904.

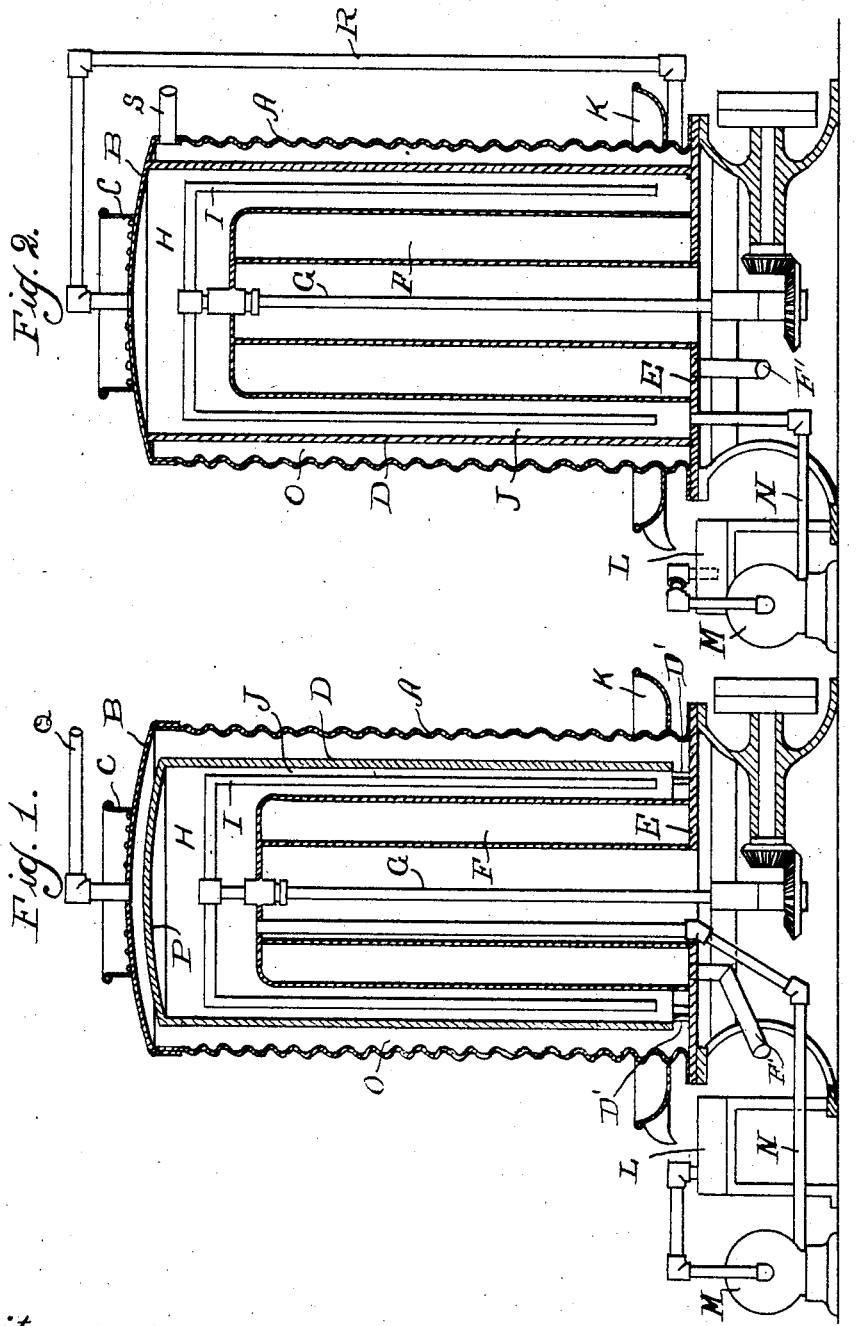

UNITED STATES PATENT OFFICE.

JOSEPH WILLMANN, OF CHICAGO, ILLINOIS.

APPARATUS FOR HEATING OR STERILIZING LIQUIDS.

SPECIFICATION forming part of Letters Patent No. 777,826, dated December 20, 1904.

Application filed July 16, 1903. Serial No. 165,884.

*To all whom it may concern:*

Be it known that I, JOSEPH WILLMANN, a citizen of Germany, residing at Chicago, in the county of Cook and State of Illinois, have invented certain new and useful Improvements in Apparatus for Heating or Sterilizing Liquids; and I do hereby declare the following to be a full, clear, and exact description of the invention, such as will enable others skilled in the art to which it appertains to make and use the same.

My invention relates to a novel construction in an apparatus for heating or sterilizing liquids, particularly milk, the object being to provide simple and economical means for continuously heating such liquid gradually to the desired temperature and then gradually cooling the heated liquid leaving the apparatus by absorption of a part of its heat by the cooler liquid entering said apparatus; and it consists in the features of construction and combinations of parts hereinafter fully described and claimed.

In the accompanying drawings, illustrating my invention, Figure 1 is a central vertical section of an apparatus constructed in accordance with my invention. Fig. 2 is a similar view of a slightly-modified form of construction.

My said apparatus consists of a cylindrical casing A, which is suitably supported and is capped at its upper end by means of the dished head B, the latter being provided with an annular perforated collar C, forming a receptacle to receive and distribute milk or other liquid to be subjected to the process over the said cylinder A. Within the latter and preferably supported concentric therewith on the legs D' is a second cylinder D, which is open at its lower end and terminates at a point slightly above the bottom E of said cylinder A. Said cylinder D is preferably constructed of a material which is a very poor conductor of heat. Within said cylinder D and resting on said bottom E is an annular drum F, communicating with a source of supply of steam or other heating fluid through the pipe F', said drum being of less height than said cylinders A and D. Passing centrally through said drum F is a vertical shaft G, which projects into the space H above said drum and is journaled in a bearing in the bottom E and in a stuffing-box in the upper wall of said drum F. Said shaft G carries one or more inverted-U-shaped arms I at its upper end, which depend at their free ends into the annular space J between said drum F and said cylinder D, said arms acting as stirrers to constantly agitate the liquid being heated and prevent same from coagulating on the walls of said drum F. Said shaft G is rotated in any suitable manner. On the outer face of said cylinder A adjacent its lower end is an annular receptacle K, having a spout at one point through which the liquid passes into a receptacle L, with which the suction end of a pump M is connected, the delivery end of the latter being connected, by means of a pipe N, with said space H above said drum F.

In operation my device is as follows: The liquid is fed into the receptacle formed by the cap B and collar C thereon and flows through the perforations in the latter, whereby it is evenly distributed and flows over the outer face of said cylinder A, the latter being preferably corrugated, so as to present a large surface. Such liquid passes into said receptacle K, thence into receptacle L, from which it is transferred by the pump into said space H and flows over the wall of the drum F, where it is heated, such liquid being adapted to entirely fill the annular space J and being stirred by said arms I. After being thus heated said liquid passes into the annular space O between the cylinders A and D and upwardly through the same. During its passage through said annular space O said liquid is isolated from the heating-drum and a large portion of the heat contained in said liquid is absorbed by the cooler liquid passing over the outer face of said cylinder A, so that the heated liquid is cooled to the extent desired and only a very little of the contained heat is wasted. After passing through said annular space O said liquid passes through the space between the head B of cylinder A and the head P of cylinder D and passes out through the pipe Q.

The construction shown in Fig. 2 coincides almost exactly with that shown in Fig. 1 with the exception that the cylinder D extends from the bottom E of the cylinder A to the head B thereof, the annular space O between said cylinders being connected by a pipe R, entering the lower end of said space O, with the upper end of the chamber H and delivers through a pipe S, entering the upper end of said annular space, while the delivery end of the pump is connected with the lower end of the annular space J instead of with the chamber H directly, as in Fig. 1. The operation of this modified form of apparatus is so nearly identical with that of the apparatus shown in Fig. 1 as to render special description superfluous.

This apparatus is particularly efficacious in pasteurizing or sterilizing milk, but may obviously be used for a large variety of purposes.

I claim as my invention—

1. The combination with a sealed cylindrical casing, an annular perforated collar on the upper wall of said casing adapted to receive liquid and distribute same to flow evenly down the outer face of said casing, an annular collecting-pan at the lower end of said casing, a spout thereon, a receptacle adapted to receive said liquid, and a pump connected at its suction end with said receptacle, of an annular heating-drum of less height, and diameter than said casing mounted concentrically within the same, an isolating-wall of less diameter than said casing and greater diameter than said drum interposed concentrically between said drum and said casing, said isolating-wall being supported in fixed position by legs bearing on the bottom of the casing, there being annular chambers between said drum and said isolating-wall and between the latter and said casing, rotating stirrers revolving in said annular chamber between said drum and said isolating-wall, connection between said chamber and the delivery end of said pump, connection between said chamber and the chamber between said isolating-wall and said casing, and an outlet for the liquid from the latter.

2. The combination with a sealed casing, a perforated collar on top of the casing, a collecting-pan at the lower end of the casing, a receptacle adapted to receive the liquid from said pan and a pump connected at its suction end with said receptacle and at its exit end with the interior of the casing at the bottom thereof with an annular drum located in the casing, an isolating-wall arranged within the casing between the wall of the latter and the outer wall of the drum and extending from the top to the bottom of the casing, a shaft arranged within the casing, stirrers connected to said shaft and projecting downwardly between the drum and the isolating-wall, a pipe leading from the space in the casing inside the isolating-wall to the space in the casing outside the isolating-wall and an exit-pipe leading from the last-named space.

In testimony whereof I affix my signature in presence of two witnesses.

JOSEPH WILLMANN.

Witnesses:
RUDOLPH WM. LOTZ,
WM. B. SNOWHOOK.